(12) United States Patent
Bunker et al.

(10) Patent No.: US 10,352,177 B2
(45) Date of Patent: Jul. 16, 2019

(54) AIRFOIL HAVING IMPINGEMENT OPENINGS

(71) Applicant: General Electric Company, Schenectady, NY (US)

(72) Inventors: Ronald Scott Bunker, West Chester, OH (US); Robert David Briggs, West Chester, OH (US); Timothy Deryck Stone, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 655 days.

(21) Appl. No.: 15/044,697

(22) Filed: Feb. 16, 2016

(65) Prior Publication Data

US 2017/0234146 A1 Aug. 17, 2017

(51) Int. Cl.
 *F01D 5/14* (2006.01)
 *F01D 5/18* (2006.01)

(52) U.S. Cl.
 CPC ............. *F01D 5/188* (2013.01); *F01D 5/147* (2013.01); *F01D 5/186* (2013.01); *F05D 2220/32* (2013.01); *F05D 2240/24* (2013.01); *F05D 2240/303* (2013.01); *F05D 2260/201* (2013.01); *F05D 2260/2212* (2013.01); *F05D 2260/22141* (2013.01); *Y02T 50/676* (2013.01)

(58) Field of Classification Search
 None
 See application file for complete search history.

(56) References Cited

U.S. PATENT DOCUMENTS

| 4,063,851 | A | 12/1977 | Weldon |
| 4,505,639 | A | 3/1985 | Groess et al. |
| 5,100,293 | A * | 3/1992 | Anzai ............. F01D 5/186 416/96 A |
| 5,667,359 | A | 9/1997 | Huber et al. |
| 5,857,837 | A | 1/1999 | Zelesky et al. |
| 6,068,445 | A | 5/2000 | Beeck et al. |
| 6,099,251 | A | 8/2000 | LaFleur |
| 6,890,153 | B2 | 5/2005 | Demers et al. |
| 7,520,725 | B1 | 4/2009 | Liang |
| 8,231,329 | B2 | 7/2012 | Benjamin et al. |
| 8,757,974 | B2 | 6/2014 | Propheter-Hinckley et al. |
| 2002/0062945 | A1 * | 5/2002 | Hocker ............. F01D 5/189 165/53 |

(Continued)

FOREIGN PATENT DOCUMENTS

| EP | 0 416 542 A1 | 3/1991 |
| EP | 1 469 164 A2 | 10/2004 |
| EP | 1921268 A1 | 8/2006 |

OTHER PUBLICATIONS

Extended European Search Report and Opinion issued in connection with corresponding EP Application No. 17156053.5 dated Aug. 7, 2017.

*Primary Examiner* — Jason D Shanske
*Assistant Examiner* — Theodore C Ribadeneyra
(74) *Attorney, Agent, or Firm* — McGarry Bair PC (57) ABSTRACT

An airfoil for a turbine engine having a perimeter wall bounding an interior and defining a pressure side and a suction side, a radially extending rib located within the interior and spaced from the leading edge to define a radially extending leading edge chamber, and at least one impingement opening in the rib defining a flow path aligned with the leading edge.

28 Claims, 6 Drawing Sheets

(56) References Cited

U.S. PATENT DOCUMENTS

2004/0219016 A1* 11/2004 Demers .................. F01D 5/186
                                                    416/97 R
2007/0297916 A1    12/2007 Levine et al.
2007/0297917 A1    12/2007 Levine et al.

* cited by examiner

AIRFOIL HAVING IMPINGEMENT OPENINGS

BACKGROUND OF THE INVENTION

Turbine engines, and particularly gas or combustion turbine engines, are rotary engines that extract energy from a flow of combusted gases passing through the engine onto a multitude of rotating turbine blades. Turbine engines have been used for land and nautical locomotion and power generation, but are most commonly used for aeronautical applications such as for aircraft, including helicopters. In aircraft, turbine engines are used for propulsion of the aircraft. In terrestrial applications, turbine engines are often used for power generation.

Turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect embodiments of the invention relate to an airfoil for a turbine engine, the airfoil comprising a perimeter wall bounding an interior and defining a pressure side and a suction side extending axially between a leading edge and a trailing edge to define a chord-wise direction and extending radially between a root and a tip to define a span-wise direction, a radially extending rib located within the interior and spaced from the leading edge to define a radially extending leading edge chamber, at least one impingement opening in the rib defining a flow path, and at least one flow splitter having a first arm extending between the pressure side and the suction side at the leading edge and aligned with the flow path.

In another aspect embodiments of the invention relate to a method of generating swirl flow in a leading edge chamber of a blade for a turbine engine comprising introducing an impinging airflow through an internal rib of the airfoil onto a flow splitter having a first arm located on an inner surface of the leading edge chamber to split the impinging airflow into at least two swirl airflows having a chord-wise airflow component.

In a further aspect embodiments of the invention relate to a blade for a turbine engine, the blade comprising: a perimeter wall bounding an interior and defining a pressure side and a suction side extending axially between a leading edge and a trailing edge and extending radially between a root and a tip, a radially extending structure rib located within the interior, spanning between the pressure side and the suction side, and spaced from the leading edge to define a radially extending leading edge chamber, a plurality of radially arranged impingement openings in the rib, a plurality of cross-shaped flow splitters, and having at least one radial arm, provided on the perimeter wall at the leading edge and arranged in correspondence with the impingement openings.

DESCRIPTION OF EMBODIMENTS OF THE INVENTION

The described embodiments of the present invention are directed to an airfoil and in particular to cooling an airfoil. For purposes of illustration, the present invention will be described with respect to a turbine blade for an aircraft turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

Figure 1:
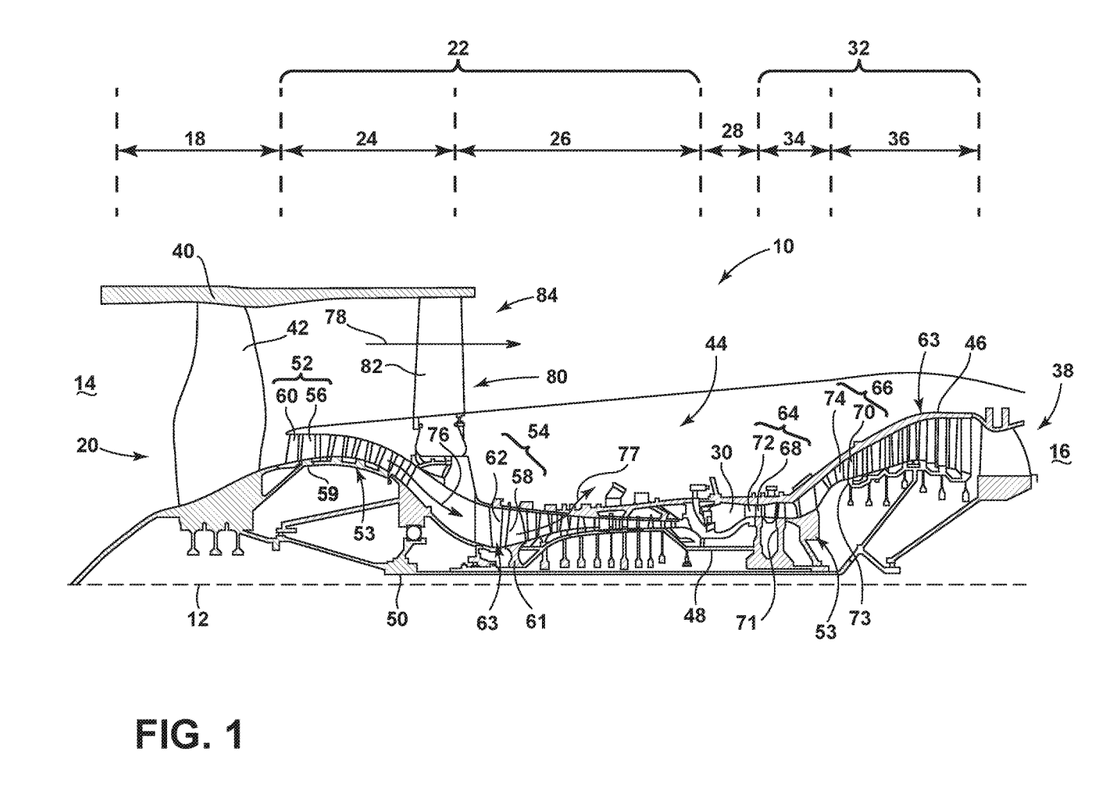
FIG. 1 is a schematic cross-sectional diagram of a turbine engine for an aircraft.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 75 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 85. More specifically, a circumferential row of radially extending airfoil guide vanes 82 are utilized adjacent the fan section 18 to exert some directional control of the airflow 75.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
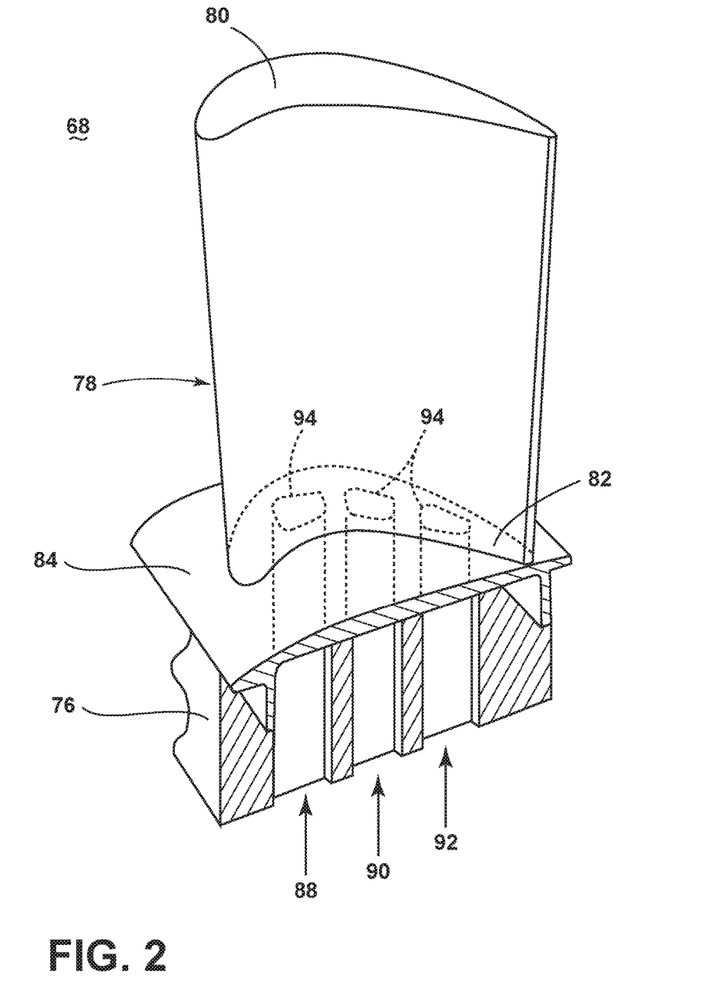
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 79 and an airfoil 78. The airfoil 78 extends radially between a root 83 and a tip 81. The dovetail 79 further includes a platform 84 integral with the airfoil 78 at the root 83, which helps to radially contain the turbine airflow. The dovetail 79 can be configured to mount to a turbine rotor disk on the engine 10. The dovetail 79 comprises at least one inlet passage, exemplarily shown as a first inlet passage 88, a second inlet passage 90, and a third inlet passage 92, each extending through the dovetail 79 to provide internal fluid communication with the airfoil 78 at a passage outlet 94. It should be appreciated that the dovetail 79 is shown in cross-section, such that the inlet passages 88, 90, 92 are housed within the body of the dovetail 79.

Figures 3, 4:
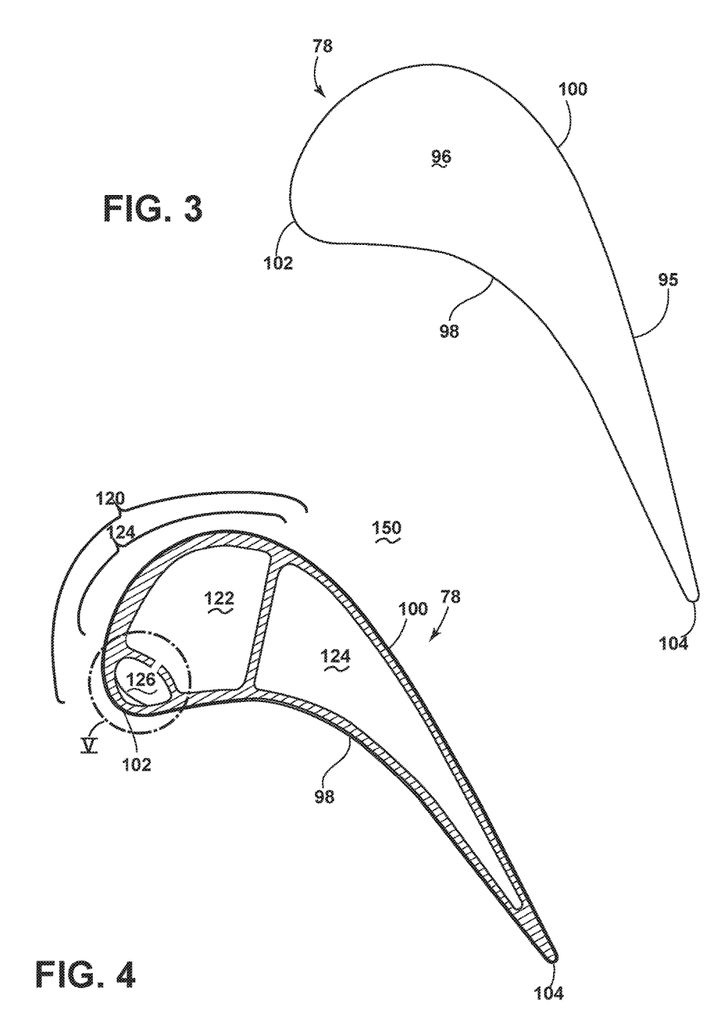
FIG. 3 is a cross-sectional view of the airfoil of FIG. 2.
FIG. 4 is a diagram view of a plurality of internal passages disposed within the cross-sectional view of the airfoil of FIG. 3.

Turning to FIG. 3, the airfoil 78, shown in cross-section, comprises a perimeter wall 95 bounding an interior 96 having a concave-shaped pressure side 98 and a convex-shaped suction side 100 which are joined together to define an airfoil shape extending axially between a leading edge 102 and a trailing edge 104 to define a chord-wise direction and extending radially between a root and a tip to define a span-wise direction. The blade 68 rotates in a direction such that the pressure side 98 follows the suction side 100. Thus, as shown in FIG. 3, the airfoil 78 would rotate upward toward the top of the page.

The airfoil 78 comprises a plurality of internal passages which can be arranged to form one or more cooling circuits dedicated to cool a particular portion of the blade 68. The passages and the corresponding cooling circuits are illustrated in FIG. 4, which is a cross-sectional view of the airfoil 78. It should be appreciated that the respective geometries of each individual passage within the airfoil 78 as shown is exemplary, each depicting one or more elements of passages forming cooling circuits and should not limit the airfoil to the geometries, dimensions, or positions as shown.

The cooling circuits can be defined by one or more passages extending radially within the airfoil 78. It should be appreciated that the passages can comprise one or more film holes which can provide fluid communication between the particular passage and the external surface of the airfoil 78, providing a film of cooling fluid along the external surface of the airfoil 78.

A cooling circuit shown as a leading edge cooling circuit 120 comprises a plurality of passages disposed within the interior of the airfoil 78. The leading edge cooling circuit 120 includes at least two radially extending cooling chambers comprising an inner chamber 122 and a leading edge chamber 126. The leading edge chamber 126 includes a row of film openings (not shown) extending along and passing through the leading edge 102. The inner chamber 122 radially extends from root 83 to tip 81, being in fluid communication with an inlet in the dovetail 79 such as the first inlet passage 88.

The leading edge chamber 126 is also in fluid communication with the inner chamber 122, radially extending from root 83 to tip 81 and disposed adjacent to the leading edge 102. A radially extending rib 130, located within the interior 96, is disposed between and partially defines the inner chamber 122 and the leading edge chamber 126. The rib 130 spans the interior 96 of the airfoil 78, extending between the pressure side 98 and the suction side 100. The rib 130 can be straight or curved. The leading edge chamber 126 is in fluid communication with the inner chamber 122 via one or more impingement openings 132 disposed within the rib 130, extending from root 83 to tip 81.

The interior 96 of the airfoil 78 can further comprise one or more additional cooling circuits defined by one or more internal passages 124 comprising mesh passages, pin banks, slots, impingement openings, and a plurality of film holes, providing cooling fluid throughout the airfoil 78 or exhausting cooling fluid from the airfoil 78 to provide a cooling film to the exterior of the airfoil 78. The internal passages 124 extend in a root 83 to tip 81 or tip 81 to root 83 direction and can be interconnected with one another such that one or more cooling circuits are defined.

It should be appreciated that a geometry with a near-wall chamber having a cooling circuit can implement one or more ribs along the span-wise length of the rib extending between the root 83 and the tip 81 of the airfoil 78.

It should be understood that the leading edge cooling passages can comprise a plurality of film holes extending between the exterior of the airfoil 78 and the leading edge chamber 126, such that a cooling fluid can be provided as a cooling film to the exterior surface of the airfoil 78. The airfoil 78 can comprise a blade for a compressor or turbine of the turbine engine.

Figure 5:
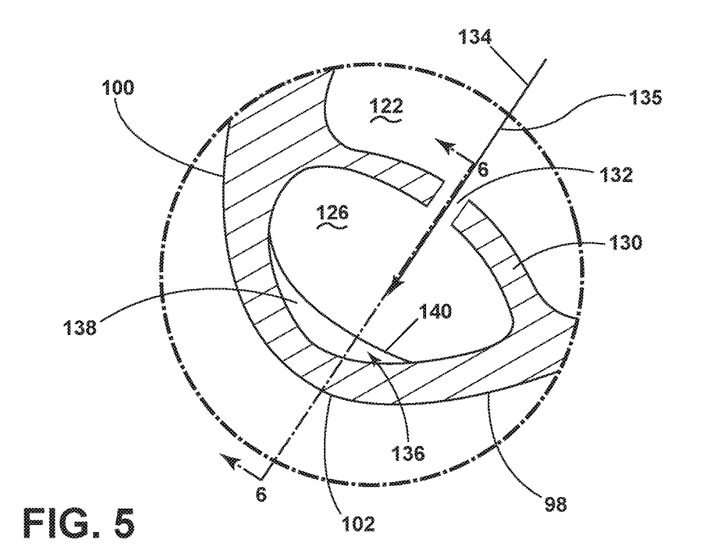
FIG. 5 is an enlarged view of a leading edge of the airfoil of FIG. 4 including a concave arcuate cross-over rib.

Turning to FIG. 5 an enlarged view of the leading edge chamber 126 illustrates the cross-sectional shape of the rib 130. The rib 130 comprises a concave, arcuate shape with respect to the leading edge chamber 126 having a substantially equivalent width defined along the cross-sectional arcuate length of the rib 130. At least one impingement opening 132 in the rib 130 fluidly couples the inner chamber 122 to the leading edge chamber 126 along the radial, span-wise length of the rib 130, extending between the root 83 and the tip 81.

The impingement opening 132 defines a flow path 134 for an impinging airflow 135. The flow path 134 is oriented to align with a flow splitter 136 having an arcuate profile and extending between the pressure side and the suction side at the leading edge 102. The flow splitter 136 includes at least one arm 138 positioned generally orthogonal to the span-wise direction.

Figure 6:
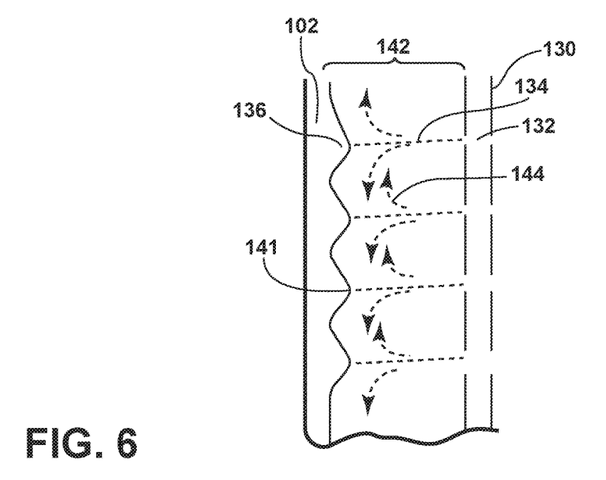
FIG. 6 is cross-sectional view of FIG. 5.

Turning to FIG. 6 the leading edge 102 and rib 130 can each include a plurality of flow splitters 136 and impingement openings 132 respectively. Each flow splitter is arranged radially and paired with a corresponding impingement opening 132. The flow path 134 of the impingement opening 132 of one pair 142 aligns with the flow splitter 136 of the same pair 142. Impinging airflow 135 is split in a span-wise direction to form a swirl flow 144 having two components, which have opposite rotation, after it comes into contact with the flow splitter 136.

The flow splitter 136 can be sharp or rounded, or something in between, but generally symmetric about a peak 141 and have an arcuate profile when viewed in the span-wise direction. The flow splitter 136 can also include a converging cross section in the chord-wise direction for the arm 138 terminating in the ridge line 140 and reducing in height extending chord-wise. Film holes (not shown) can be located anywhere, including right through the flow splitters 136 if necessary.

Figure 7:
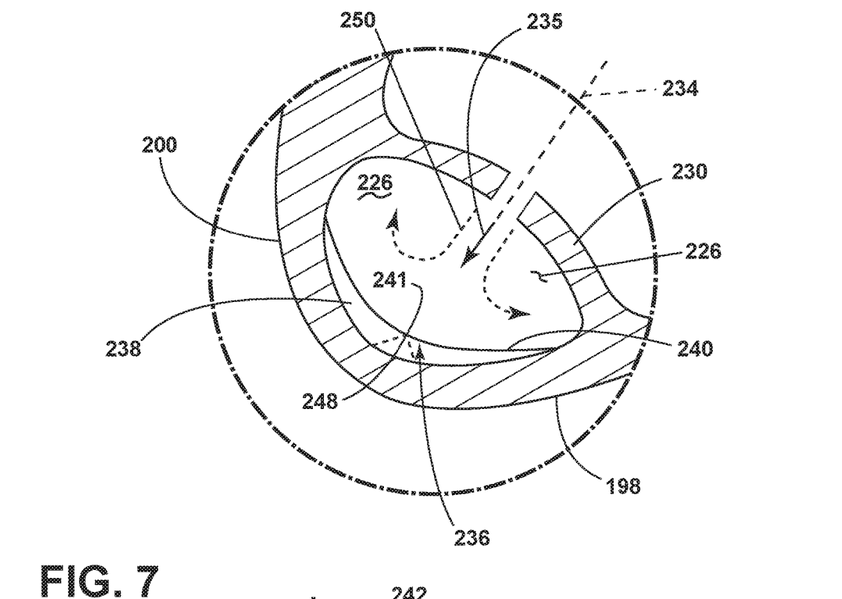
FIG. 7 is an enlarged view of a second embodiment of the leading edge of the airfoil of FIG. 4 including a concave arcuate cross-over rib.
Figure 8:
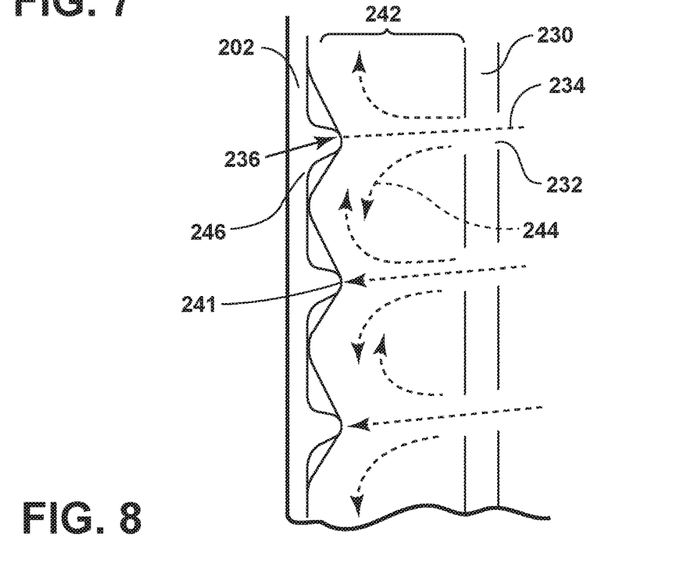
FIG. 8 is cross-sectional view of FIG. 8.
Figure 9:
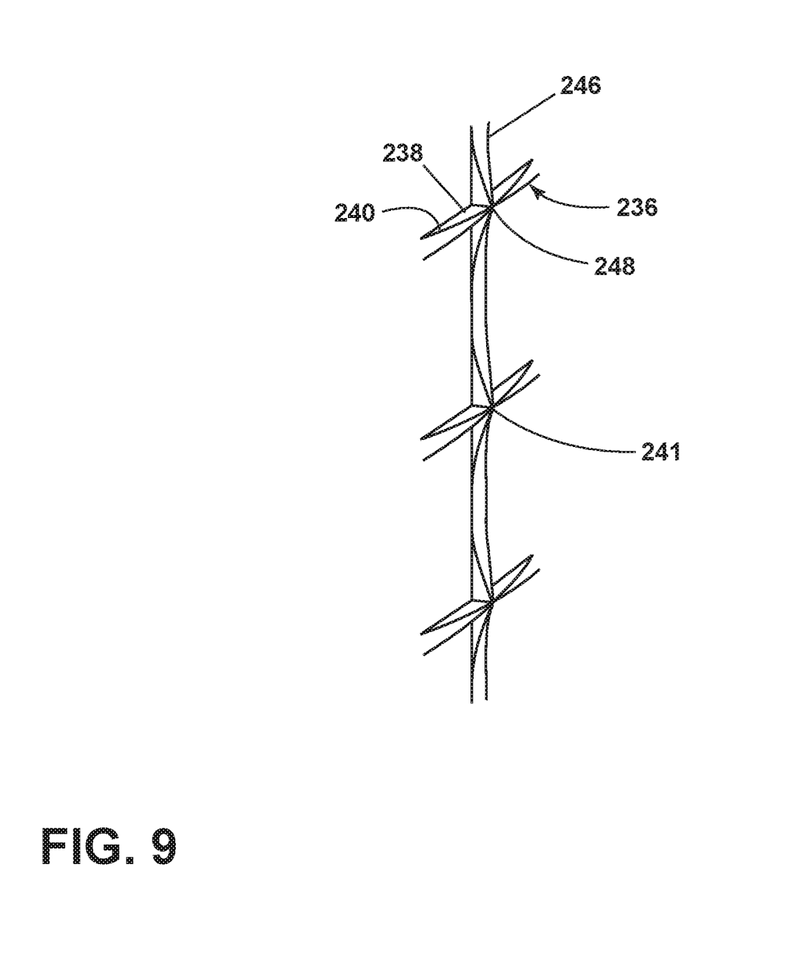
FIG. 9 is a perspective view of the leading edge of FIG. 8 with a plurality of flow splitters.

A second embodiment of the flow splitter is contemplated in FIGS. 7, 8, 9. The second embodiment is similar to the first embodiment, therefore, like parts will be identified with like numerals increasing by 100, with it being understood that the description of the like parts of the first embodiment applies to the additional embodiments, unless otherwise noted.

In the second embodiment illustrated in FIG. 7 a flow splitter comprises a cross-shaped flow splitter 236 including a first arm 238 generally orthogonal to the span-wise direction and a second arm 246 extending span-wise to intersect the first arm at substantially 90 degrees. A flow path 234 aligns with an intersection 248 formed where the two arms cross. The impinging airflow 235 is split into four parts to form a swirl flow comprising two components that are span-wise 244 and two that are chord-wise 250 when it comes in contact with the flow splitter 236.

It should be understood that the geometry and shape of the flow splitter can again be sharp or rounded, or somewhere in between, and one of either the first or second arms 238, 246 can include a height that is constant remaining at the chord-wise peak 241, or a height one of which is greater than the other.

FIG. 8 illustrates a cross-sectional view depicting the swirl flow in the span-wise direction 244. This axial profile illustrates a reduction of height of the second arm 246 in the span-wise direction.

A perspective view of the plurality of cross-shaped flow splitters 236 in FIG. 9 further illustrates the reduction of height for both the first and second arm 238, 246. Film holes (not shown) can be located anywhere, including right through the flow splitters 236 if necessary.

While in the first embodiment, flow splitter 136 tapers away in the chord-wise direction, the second embodiment flow splitter 236 can taper between consecutive span-wise flow splitters as shown in FIG. 9, or it can include other geometric patterns. For example these patterns include, but are not limited to maintaining a constant height along the span-wise direction or undulating in a sinusoidal or wave pattern in the span-wise direction.

A method of generating a swirl flow 144, 244, 250 in the leading edge chamber 126, 226 includes introducing the impingement airflow 135, 235 along the flow path 234 onto the flow splitter 136, 236, to split the impinging airflow 135, 235 into at least two airflows 144 having chord-wise flow components. The method can also include splitting the impinging airflow 135, 235 into at least four airflows having chord-wise 144, 244 and span-wise components 250. The impinging airflow 135, 235 can be a cooling airflow and some of the airflow can further travel through the leading edge by way of film holes.

It should be appreciated that the arms for the cross-shaped flow splitter are not limited to being orthogonal to each other. They can have any desired orientation to the span-wise and chord-wise directions as well as any orientation to each other.

It should be further appreciated that an arcuate cross-section for the cross-over rib, being concave or convex with respect to the leading edge cooling passage, provides stress relief for the cross-over rib as well as associated components often affected by the stresses adjacent the leading edge of the airfoil.

It should be further appreciated that while there are no film holes shown, it is understood that film holes are placed and that the placement, orientation, and number of film holes can vary. The film holes can further be located and oriented based upon the flow direction developed by impingement openings within the airfoil.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
   a perimeter wall bounding an interior and defining a pressure side and a suction side extending axially between a leading edge and a trailing edge to define a chord-wise direction and extending radially between a root and a tip to define a span-wise direction;
   a radially extending rib located within the interior and spaced from the leading edge to define a radially extending leading edge chamber;
   at least one impingement opening in the rib defining a flow path; and
   at least one flow splitter axially spaced from the rib having a first arm extending between the pressure side and the suction side at the leading edge and a second arm that intersects the first arm to form a cross-shaped flow splitter having an intersection and axially aligned with the flow path at the intersection.

2. The airfoil of claim 1 wherein the first arm is generally orthogonal to the span-wise direction.

3. The airfoil of claim 2 wherein the first arm has a converging cross section in the chord-wise direction.

4. The airfoil of claim 3 wherein the first arm has an arcuate profile when viewed in the span-wise direction.

5. The airfoil of claim 1 wherein the at least one impingement opening comprises a plurality of impingement openings arranged radially along the rib.

6. The airfoil of claim 5 wherein the at least one flow splitter comprises a plurality of flow splitters arranged radially along the rib.

7. The airfoil of claim 6 wherein the impingement openings and flow splitters are arranged in pairs.

8. The airfoil of claim 7 wherein the flow path of the impingement opening of one pair axially aligns with the flow splitter of the one pair.

9. The airfoil of claim 8 wherein the at least one flow splitter comprises consecutive span-wise flow splitters.

10. The airfoil of claim 1 wherein the first and second arms are at substantially 90 degrees to each other.

11. The airfoil of claim 10 wherein the second arm extends in the span-wise direction.

12. The airfoil of claim 1 wherein at least one of the first and second arms terminates in a ridge line at an axial extension of the at least one flow splitter.

13. The airfoil of claim 12 wherein at least one of the first or second arms continuously reduces in height outwardly of the intersection.

14. The airfoil of claim 1 further comprising film holes extending through the perimeter wall along the leading edge.

15. The airfoil of claim 14 wherein the film holes are on opposite sides of at least one of the first and second arms.

16. The airfoil of claim 15 wherein the at least one of the first and second arms extends in the span-wise direction.

17. The airfoil of claim 16 wherein the airfoil comprises a blade or nozzle for a turbine of the turbine engine.

18. A method of generating swirl flow in a leading edge chamber of an airfoil for a turbine engine comprising introducing an impinging airflow through an impingement opening in an internal rib of the airfoil onto a cross-shaped flow splitter having an intersection axially aligned with the impingement opening and axially spaced from the internal rib and located on an inner surface of the leading edge chamber to split the impinging airflow into at least two swirl airflows having chord-wise airflow components.

19. The method of claim 18 further comprising impinging airflow onto the cross-shaped flow splitter and splitting the airflow into at least four airflows having chord-wise and span-wise airflow components.

20. The method of claim 18 wherein the impinging airflow is cooling airflow.

21. The method of claim 18 further comprising emitting at least some of the swirl airflows through film holes extending through the leading edge of the airfoil.

22. A blade for a turbine engine, the blade comprising:
   a perimeter wall bounding an interior and defining a pressure side and a suction side extending axially between a leading edge and a trailing edge and extending radially between a root and a tip;
   a radially extending structure rib located within the interior, spanning between the pressure side and the suction side, and spaced from the leading edge to define a radially extending leading edge chamber;
   a plurality of radially arranged impingement openings in the rib; and
   a plurality of cross-shaped flow splitters each having an intersection axially aligned with the impingement openings and axially spaced from the rib, having at least one radial arm, provided on the perimeter wall at the leading edge and arranged in correspondence with the impingement openings.

23. The blade of claim 22 wherein the cross-shaped flow splitter comprises at least first and second arms that intersect each other forming an intersection.

24. The blade of claim 23 wherein the first and second arms are at substantially 90 degrees to each other.

25. The blade of claim 24 wherein the first arm extends radially.

26. A blade for a turbine engine, the blade comprising:
   a perimeter wall bounding an interior and defining a pressure side and a suction side extending axially between a leading edge and a trailing edge and extending radially between a root and a tip;
   a radially extending structure rib located within the interior, spanning between the pressure side and the suction side, and spaced from the leading edge to define a radially extending leading edge chamber;
   a plurality of radially arranged impingement openings in the rib; and
   a plurality of cross-shaped flow splitters axially spaced from the rib, having at least one radial arm, provided on the perimeter wall at the leading edge and arranged in correspondence with the impingement openings;
   wherein the cross-shaped flow splitter comprises at least first and second arms that intersect each other forming an intersection and at least one of the first and second arms terminates in a ridge line at an axial extension of the cross-shaped flow splitter.

27. The blade of claim 26 wherein the at least one of the first and second arms reduces in height outwardly of the intersection.

28. The blade of claim 26 wherein the second arm tapers between consecutive span-wise cross-shaped flow splitters.

* * * * *